US006839035B1

United States Patent
Addonisio et al.

(10) Patent No.: US 6,839,035 B1
(45) Date of Patent: Jan. 4, 2005

(54) MAGNETICALLY COUPLED ANTENNA RANGE EXTENDER

(75) Inventors: Louis Addonisio, Medford, NY (US); Marc Chomet, Huntington, NY (US)

(73) Assignee: A.C.C. Systems, Glen Head, NY (US)

( * ) Notice: Subject to any disclaimer, the term of this patent is extended or adjusted under 35 U.S.C. 154(b) by 0 days.

(21) Appl. No.: 10/680,487

(22) Filed: Oct. 7, 2003

(51) Int. Cl.[7] .......................... H01Q 11/12; G08B 13/14
(52) U.S. Cl. ...................... 343/742; 343/741; 343/866; 343/867; 340/572.1; 340/573.1; 340/870.1
(58) Field of Search ................................. 343/741, 742, 343/866, 867, 895, 744, 748, 870; 340/572.1, 573.1, 870.1; H01Q 11/12; G08B 13/14

(56) References Cited

U.S. PATENT DOCUMENTS

| 5,168,282 A | 12/1992 | Viereck |
| 5,285,177 A | 2/1994 | Norose |
| 5,420,579 A | 5/1995 | Urbas et al. |
| 6,069,564 A | 5/2000 | Hatano et al. |
| 6,118,379 A | 9/2000 | Kodukula et al. |
| 6,147,606 A | 11/2000 | Duan |
| 6,278,413 B1 | 8/2001 | Hugh et al. |
| 6,281,794 B1 | 8/2001 | Duan et al. |
| 6,396,438 B1 | 5/2002 | Seal |
| 6,400,274 B1 | 6/2002 | Duan et al. |
| 6,480,110 B2 * | 11/2002 | Lee et al. ................. 340/572.5 |
| 6,516,182 B1 | 2/2003 | Smit et al. |
| 2002/0044058 A1 * | 4/2002 | Heinrich et al. ......... 340/572.1 |
| 2003/0043949 A1 * | 3/2003 | O'Toole et al. ............. 375/374 |

* cited by examiner

*Primary Examiner*—Hoanganh Le
(74) *Attorney, Agent, or Firm*—Island Patent; F. S. Tierno (57) ABSTRACT

A magnetically coupled antenna range extender structured to be interposed between an RF antenna and an electronic device. The antenna range extender is positioned between and proximate to one of the RF antenna and the electronic device, for extending the operating range over which information may be communicated and exchanged between the RF antenna and the electronic device.

38 Claims, 8 Drawing Sheets

MAGNETICALLY COUPLED ANTENNA RANGE EXTENDER

CROSS REFERENCE TO RELATED APPLICATIONS

The subject matter provided herein is related to copending application Ser. No. 10/680,484, titled "Asset Management and Status System", filed on Oct. 7, 2003, which is hereby incorporated by reference.

TECHNICAL FIELD

The present invention relates most generally to antennas. More particularly, the invention relates to a magnetically coupled antenna range extending device that is useful with radio frequency antennas for increasing an available working or operating distance between an RF antenna and an active or passive electronic component, such as an RFID tag or an RFID transponder, respectively.

BACKGROUND

Radio frequency identification (RFID) system technology is well known in the art. One or more forms of electronic devices, typically small in size, are available for use with these technologies. For example, common examples are found in passive RFID tags, as well as active RFID transponders. In the context of this disclosure the terms 'passive RFID device' or 'passive RFID tag' will include electronic devices that typically do not truly transmit RF signals, but instead reflect or backscatter transmissions generated by a proximate RFID reader or interrogator. In addition, 'active RFID devices' and 'active RFID tags', will be defined as electronic devices that actually may transmit RF signals (typically in response to received RF signals). These active devices are also known as transponders (i.e., a transmitter+a responder). When referring collectively to both passive and active RFID tags, the term 'electronic device' will be employed. As such, the term electronic device, as employed within the context of this disclosure, is to be broadly defined.

Figure 1A:
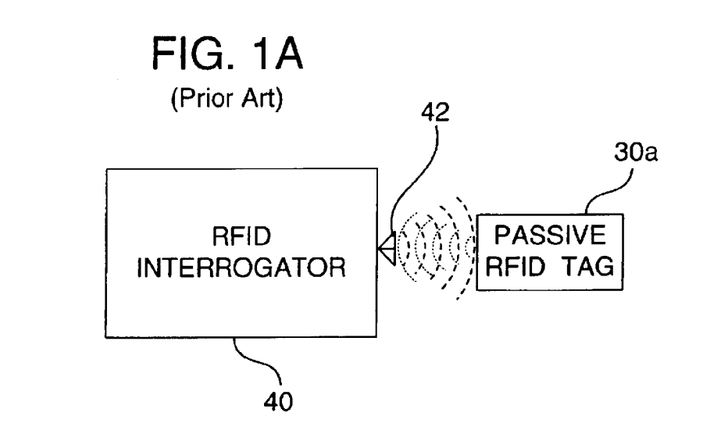
FIGS. 1A and 1B depict the prior art, wherein a passive and an active radio frequency identification (RFID) device, respectively, are interrogated by a magnetic field generated by a nearby RFID interrogator.

It may be noted that a significant difference between passive and active RFID devices is found in their operational ranges. Passive tags, are desirable due to their small size, low cost, and very long operating life. However, as indicated in FIG. 1A, a passive RFID tag 30a may have a very limited range when being interrogated by an RF signal radiated from RF antenna 42 of RFID interrogator 40. As such, it is common that a passive RFID tag 30a must be moved quite close to an RF antenna of an interrogator's reading head. For example, it is not uncommon for a passive tag to need to be from 0 to 2 centimeters away from a surface of a reading head to function properly. For a given application, having to get that close to the asset of interest may be difficult, if not impossible.

Figure 1B:
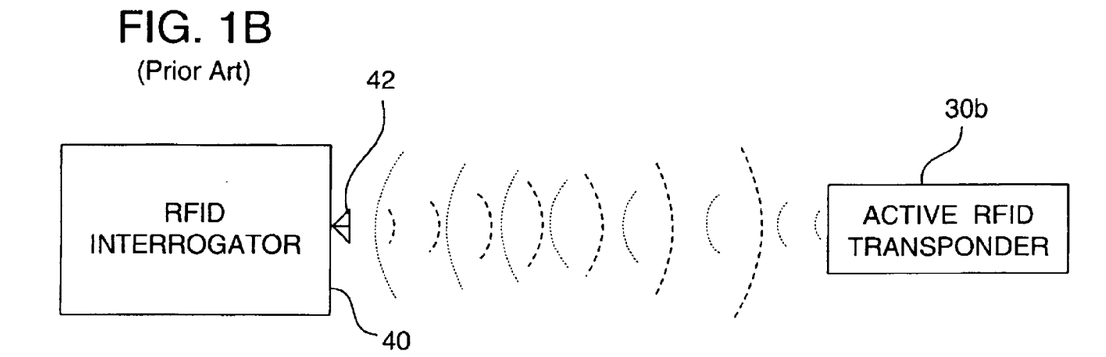

In contrast, the active RFID transponder 30b, as shown in FIG. 1B, may be read using RFID interrogator 40 over a range of multiple centimeters to multiple meters, or more. However, active transponders generally include a battery, and are larger and more expensive than their passive counterparts. This results in a significant cost difference between the low cost passive RFID tags, and the more complicated active RFID transponder devices. When considering a system such as an asset management system, wherein thousands upon thousands of assets are to be inventoried, the cost of the asset identifying means employed, such as RFID tags, can be an important cost factor.

As such, it would be desirable to provide a means to increase the operational distance over which a low cost electronic device, such as a passive RFID tag, can be interrogated (e.g., read or written), while at the same time not adding significant costs. It would be most desirable for the means to be a passive, low cost arrangement that may be employed without having to substantially modify either the electronic device (which is fixable to an asset) or the antenna portion of a suitable RFID reader or interrogator.

A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF PREFERRED EMBODIMENTS

In accordance with the present invention, a magnetically coupled radio frequency (RF) antenna range extender is structured for extending an operating range (or operating distance) between an RF antenna and an electronic device with which information is to be exchanged. Essentially an RF signal is radiated from the RF antenna and received by the electronic device. It may be noted that the RF antenna in a preferred embodiment of the invention may be a component of, and operatively coupled to, an electronic system such as a radio frequency identification (RFID) interrogator. In addition, an electronic device being interrogated in such preferred embodiments is typically provided by an RFID device, such as a passive RFID tag.

The antenna range extender includes a passive series tuned resonate circuit. The resonate circuit is constructed to be resonate at a frequency substantially equivalent to the frequency of at least one RF signal radiated by the RF antenna. For example, a preferred embodiment of a resonate circuit in accordance with the invention may be provided by an open loop coil formed substantially upon a common plane by at least one turn (or loop) of an electrical conductor, with a capacitor connected in series and completing the circuit.

The antenna range extender of the present invention, including the coil and capacitor thereof, is most preferably located interposed between, and proximate to one of the RF antenna and the electronic device. A most preferable antenna range extender is located proximate to, and interposed substantially upon an axis that is establishable between the RF antenna and a nearby electronic device—but without being directly (electrically) connected to either. As such, the antenna range extender may preferably be positioned proximate to (say 0.5 to 5 centimeters from) the RF antenna or the electronic device, so as to be magnetically coupled thereto by electromagnetic waves radiated by, at minimum, the RF antenna. These radiated electromagnetic waves, which may be termed an RF signal, are received by the electronic device (via the antenna range extender and the magnetic coupling). When properly configured, located, and oriented, as will be discussed further hereinafter, the antenna range extender increases an operating range (distance) over which an exchanging of information between the RF antenna and the electronic device can occur.

It may also be noted that a most preferred embodiment of the invention will employ RFID tags and or transponders as the electronic devices being interrogated by the RF signal radiated by the RF antenna. In the truly most preferred embodiments of the antenna range extender, the electronic devices will be provided by passive, low cost RFID tags.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted in this disclosure are but one of a number of possible arrangements utilizing the fundamental concepts of the present invention. The drawings are briefly described as follows.

| Partial List Of Reference Numerals | |
|---|---|
| 10 | antenna range extender |
| 10a | (printed circuit) antenna range extender |
| 14 | turn, coil, or plurality of coils |
| 14a | first end of 14 |
| 14b | second end of 14 |
| 18 | capacitor |
| 18a | first terminal of capacitor |
| 18b | second terminal of capacitor |
| 24 | (optional) resistor |
| 24a | first terminal of 24 |
| 24b | second terminal of 24 |
| 30 | electronic device |

-continued

| Partial List Of Reference Numerals | |
|---|---|
| 30a | passive RFID tag or RFID tag |
| 30b | (active) RFID transponder |
| 36 | range extended RFID device |
| 40 | RFID interrogator |
| 42 | RF antenna or antenna module |
| 44 | transceiver module |
| 46 | generalized electronics module |
| 48 | computer module |
| 50 | range extended RFID interrogator |
| 54 | communication link |
| 60 | center orthogonal axis |
| 64 | substrate |
| 64a | ring shaped substrate |
| 64ba, 64bb | superposed substrate(s) |
| 70 | housing of 40 or 50 |
| A | first distance (substantially along axis) |
| B | second distance (substantially along axis) |

DETAILED DESCRIPTION OF EMBODIMENTS OF THE INVENTION

Figure 6A:
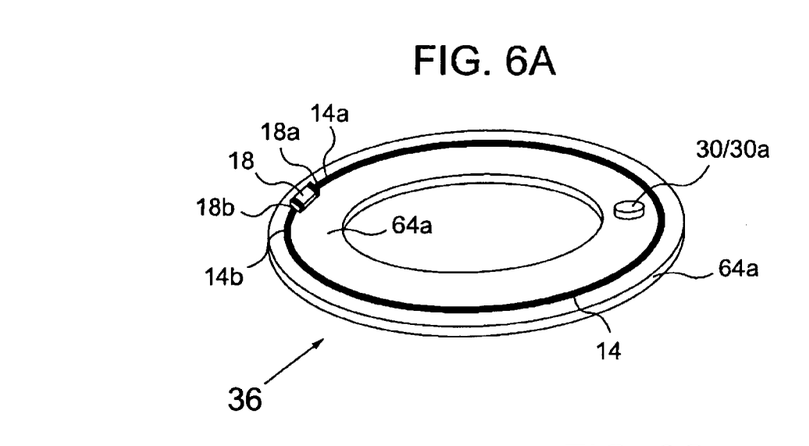
FIGS. 6A and 6B are perspective views of embodiments that are consistent with the high level depiction of the antenna range extender of FIG. 5.
Figure 8:
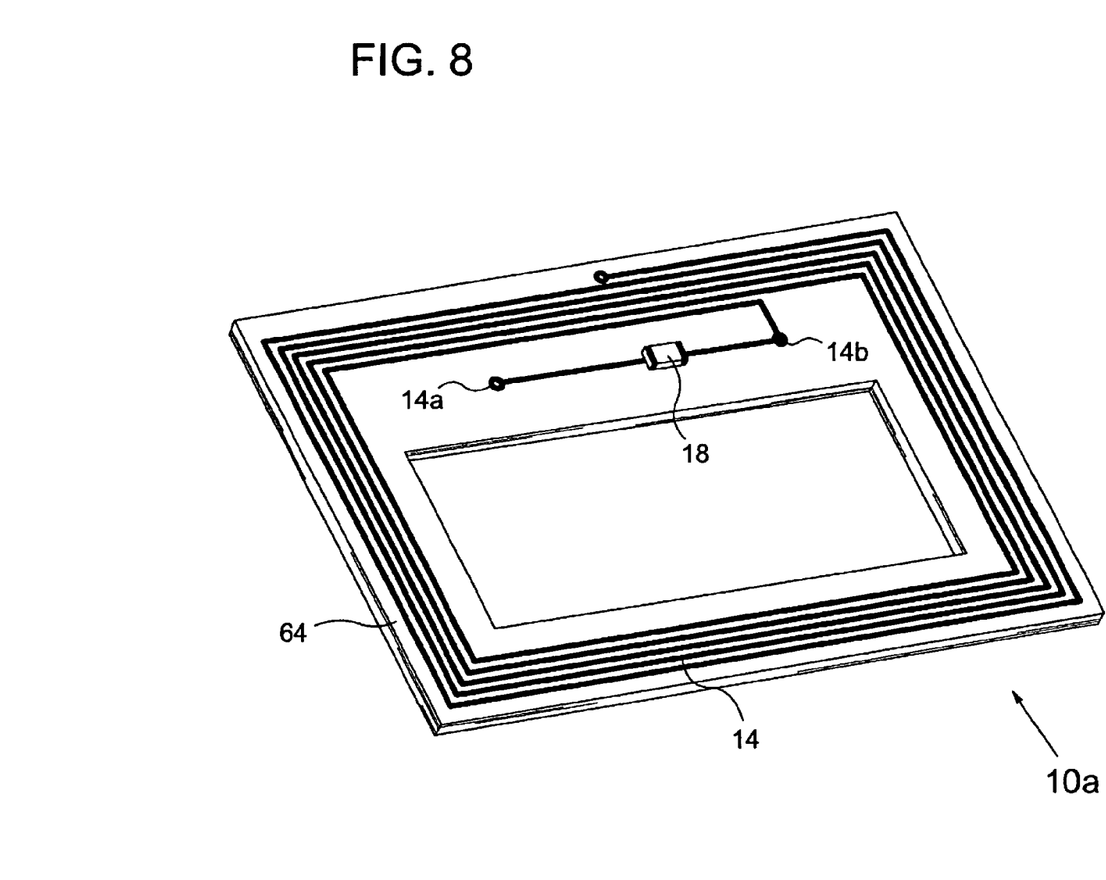
FIG. 8 illustrates a perspective view of a printed circuit board embodiment of the present invention, which may be located proximate to either an antenna of an RFID interrogator, or an electronic device such as an RFID tag/transponder.

It is important to establish the definition of a number of descriptive terms and expressions that will be used throughout this disclosure. The terms 'proximate', 'nearby', and equivalently 'closely positioned', may be best defined as a function of items, including the electronic device, the RFID interrogator, etc., with which an embodiment of the invention is structured. For example, if the electronic device is a passive RFID tag, the terms proximate may most often be defined as substantially within 0.5 to 5 centimeters (cm). As such, if an antenna range extender of the invention is fixed proximate to a reading head of the RFID interrogator (to be utilized with RFID tags), it can be assumed that a suitable distance may be substantially in the range of 0.5 to 5 centimeters. However, it is to be understood, that the term 'proximate' may actually be best defined by the embodiment in which it is employed, and the relative scales utilized therewith. The term 'oriented', when employed to describe the orientation of the antenna range extender taught herein, can be assumed to indicate an orientation wherein there is a suitable extending, or possibly a maximizing of, the operating range/distance over which information may be exchanged between an RF antenna of a reader or interrogator system and an electronic device. This term will be further discussed hereinafter when referring to FIG. 4 and a first preferred embodiment of the invention. The term 'electronic device' may be assumed to include any typically small in size, preferably low cost, electronic device that is configured to be responsive to the presence of one or more RF signals and associated magnetic fields thereof. Common examples of electronic devices in accordance with the present invention can be found in passive RFID devices or tags 30a. Yet another example may be provided by an internally powered electronic device, such as active RFID transponders. The terms 'interposed' and 'interposed between' are well known to indicate the positioning of an item substantially between two items such that an axis or line drawn from a first of the two items to the second will be close to or pass through the interposed item or article. However, for the purposes of this disclosure, when the antenna range extender of the invention is described as being interposed between an RF antenna and an electronic device, it may actually be at any location between, as well as substantially in the same plane as either the RF antenna or the electronic device. The expression 'open center area' is to indicate that an item, element, or component, for example a coil 14 of the invention, has an open center area from an electrical standpoint. In addition, an open center area item such as a printed circuit coil of antenna range extender 10a (as shown in FIGS. 6A and 8), may be structured with a physical hole or opening in a center area thereof. However, an open center area of an electrical nature indicates that from an electrical standpoint the center area is non-conductive and easily penetrated by electrical magnetic lines of flux. As such, the center area may not include a physical opening or hole as illustrated. Finally, the terms 'extended range' and 'extended operating range' are to indicate that the operating distance between the RF antenna and the electronic device can be extended while the antenna and device are still able reliably to exchange information. For example, the operating range at which an RFID tag may typically be interrogated may be extended by 100% to 1000%, or more. Other important terms and definitions will be provided, as they are needed, to properly define the present invention and its associated novel characteristics and features.

Figure 2:
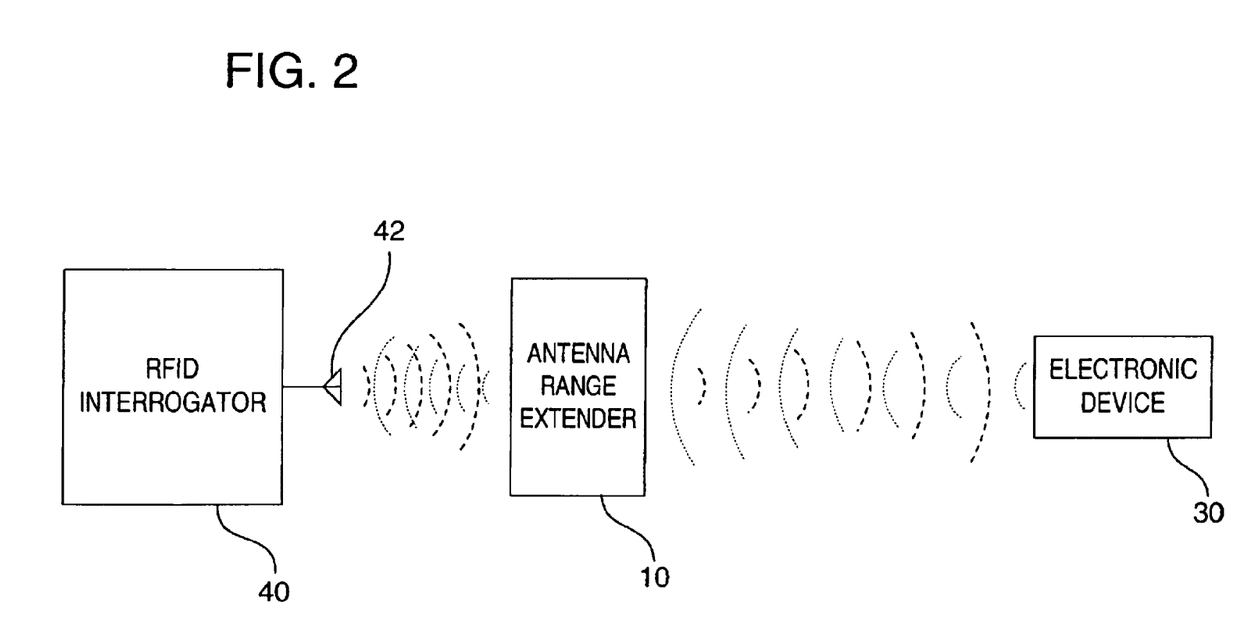
FIG. 2 provides a depiction in block diagram form of an antenna range extender of the present invention that is interposed, substantially in-line with, an RFID interrogator and an electronic device.

Referring again to the drawings, FIG. 2 provides a high level block diagram depicting the antenna range extender 10 of the invention interposed between, and substantially in-line with, an RF antenna 42 of an RFID interrogator 40 and an electronic device 30. A key result of employing the antenna range extender 10 in this interposed, in-line fashion, is that the operating range at which information can be exchanged between the RFID interrogator 40 and the electronic device 30 can be substantially increased. For example, when preferably structured, positioned, and oriented, an antenna range extender 10 of the present invention may increase the distance a passive RFID tag can be interrogated from, to that of similarly structured low cost active RFID transponder. Typically, an operating distance of 1 cm without the range extender 10, can be increased to 5 to 10 centimeters or more, when employing the antenna range extender 10. It may also be noted that the antenna range extender 10 may be located closer to (preferably within a housing of) the RFID interrogator 40, or alternately, closer to the electronic device 30, than is depicted in FIG. 2.

The actual location that provides the best range extending characteristics may vary with a number of parameters. These parameters include frequency of interrogation or operation, the structure of the RF antenna 42, the power level radiated by the RFID interrogator 40, the construction of the embedded antenna provided with the electronic device 30, as well as a number of other factors providable by skilled persons.

Figure 3:
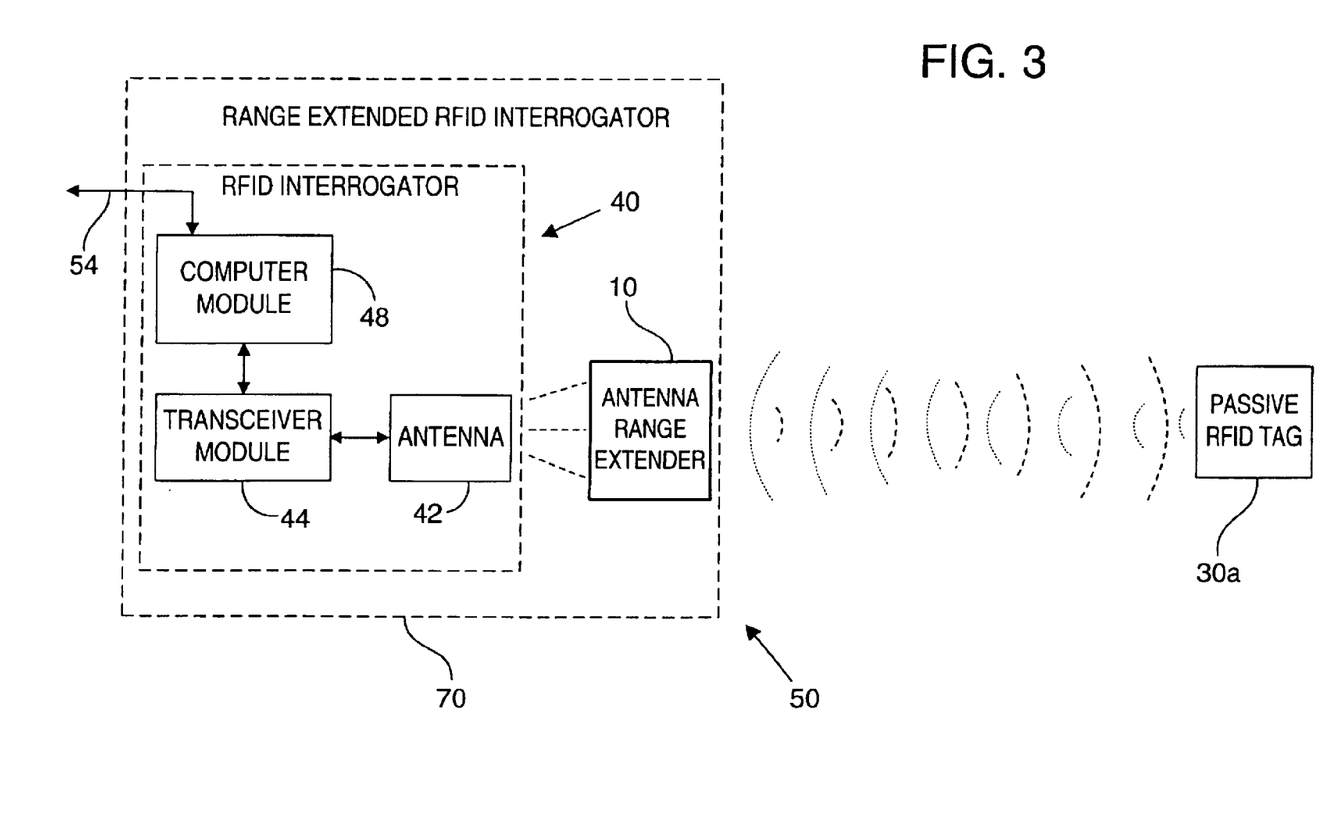
FIG. 3 provides a high level block diagram of a first preferred embodiment of the present invention.

A first preferred embodiment of the present invention is provided in FIG. 3 in the form of a high level block diagram. As shown, on the left side of FIG. 3 an RFID interrogator 40 may be structured with an RF antenna 42, which is operatively coupled to a transceiver module 44. The transceiver module 44 is in turn responsive to a computer module 48. Information exchanged with an electronic device 30, such as an RFID tag 30a, is received from, or communicated to, other systems via a communication link 54, as required. The operation of these interrogator components is well understood by skilled persons. Illustrated in FIG. 3 is a range extended RFID interrogator 50 provided by RFID interrogator 40 combined with the antenna range extender 10. As shown, it may be desirable to house both the RFID interrogator 40 and the range extender 10 in a common or shared housing 70. Accordingly, an RFID interrogator 40 may be range extended by including the antenna range extender 10, located proximate to an RF antenna 42 of the interrogator 40, such that there is a magnetic coupling that results when an RF signal is emitted or radiated by the RF antenna 42.

Figure 4:
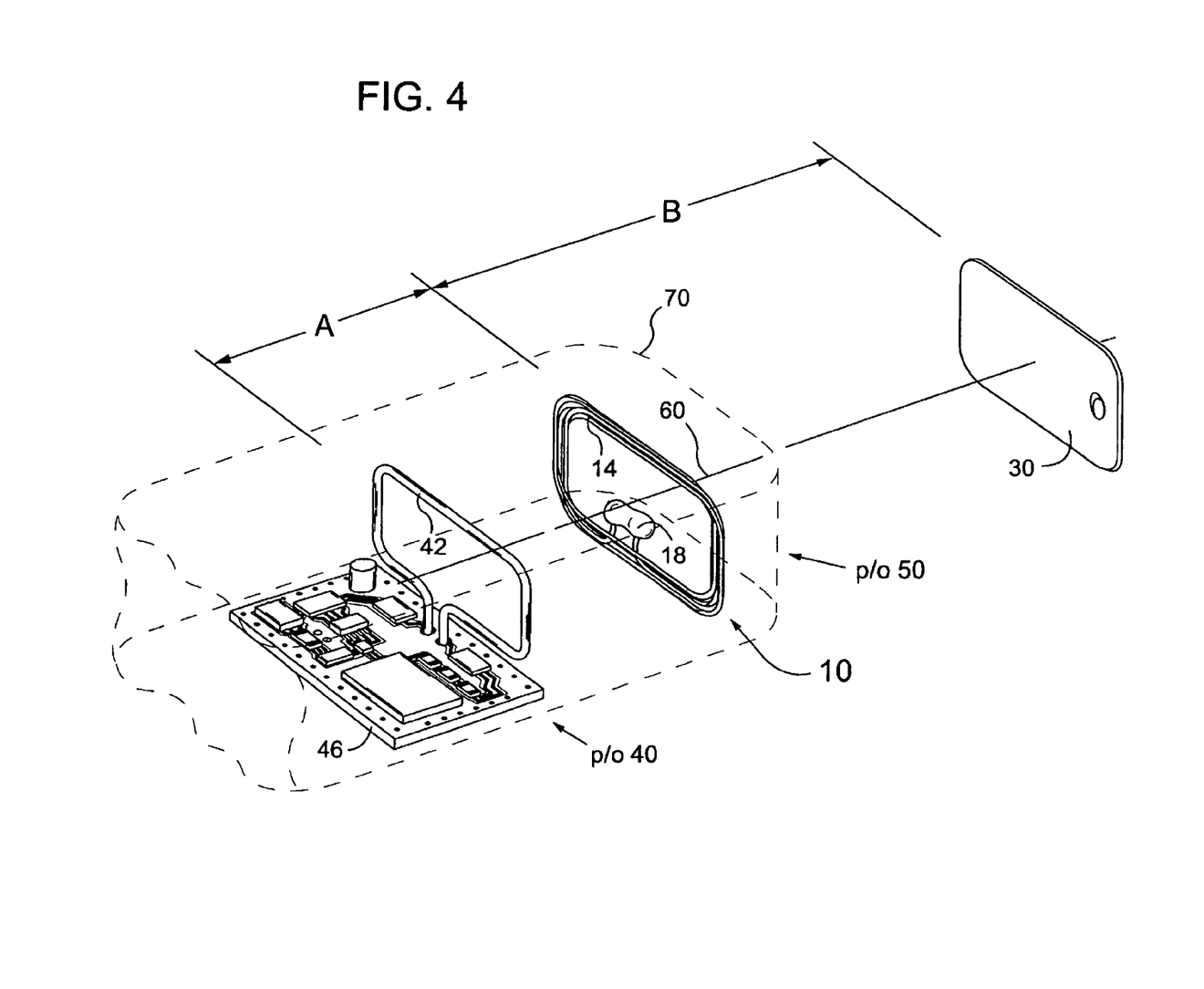
FIG. 4 illustrates a perspective view of an embodiment that is consistent with the embodiment of FIG. 3, clearly showing an RFID interrogator loop-antenna, an antenna range extender, and an electronic RFID device, with each located in a preferable 'in-line arrangement', facilitating an exchange of information therebetween at an extended range.

Turning now to FIG. 4, there is illustrated therein a perspective view of a portion of a range extended RFID interrogator 50 of the invention that is consistent with the high level embodiments of FIGS. 2 and 3. As shown, an RFID interrogator loop-antenna 42 is operatively coupled to an electronics module 46 of the RFID interrogator 40. Positioned proximate to the RF antenna 42 is an embodiment of an antenna range extender 10. As shown, the electronics module 46, the RF antenna 42, and the antenna range extender 10, may each be housed proximate to each other within the housing 70. In preferable embodiments the housing 70 would provide a hand-holdable housing and a highly portable unit.

When the antenna range extender 10 is oriented as shown in FIG. 4, it may be said to be aligned "with a center orthogonal axis 60 aligned with an axis establishable between the RF antenna 42 and the electronic device 30". This is a preferred alignment of the open-loop coils 14 of the invention. In addition, the alignment arrangement depicted in FIG. 4, may also be termed an 'in-line arrangement', which is realized when an electronic device 30 is located or positioned as shown.

Referring again to FIG. 4, the embodiment of the antenna range extender 10 illustrated includes an open-loop coil 14 preferably formed of a plurality of loops of an electrical conductor. For example, one preferable electrical conductor (or wire) may be formed of an insulated electrical wire with a wire gauge within the range of 26 to 20 AWG. As depicted in FIG. 4, and possibly best shown in FIG. 6C, the coil 14 is provided in combination with a capacitor 18, and connected in a series configuration. As can be seen in FIGS. 6A and 7A through 7C, the coil 14 is formed of at least one turn (loop) of an electrical conductor, and structured with a first end 14a and a second end 14b. The capacitor 18, which is arranged with a first terminal 18a and a second terminal 18b, is connected to the coil 14 such that the first end 14a of the coil 14 is electrically connected to the first terminal 18a of the capacitor 18, while the second end 14b of the coil 14 is electrically connected to the second terminal 18b of the capacitor 18 (or visa-versa).

It is to be understood that each of the coil 14 and capacitor 18 are most preferably non-polarized. Accordingly, the assignment of designations to the first and second end of the coil 14 may be considered arbitrary, and reversible. This is also true of the first and second terminal designations for a preferable capacitor 18 of the invention. It may also be noted that forming a tuned resonate circuit of the invention may include an optional series resistor 24, which is depicted in schematic form in FIG. 6C, and further shown in FIG. 6B. However, a most preferred embodiment of the invention omits the resistor.

Figure 6B:
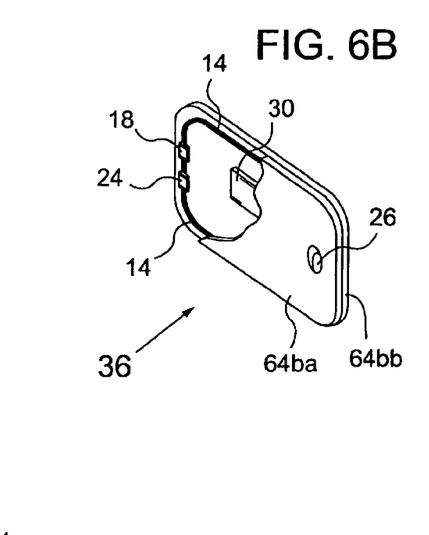

As clearly shown in FIG. 4, this embodiment of antenna range extender 10 may be located proximate the RF antenna 42, and interposed axially between the RF antenna 42 and the electronic device 30—and not directly electrically connected to either. With this arrangement, wherein the antenna range extender 10 is closely positioned, and suitably oriented as shown, there is a magnetic coupling effected when an RF signal is transmitted by the RF antenna 42. It may be noted that the resonate circuit is constructed with a resonate frequency that is substantially equal to at least one frequency transmitted by the RF antenna 42. Accordingly, the transmitted signal is magnetically coupled to the antenna range extender 10, and subsequently received by the nearby electronic device 30. Importantly, the dimension A and B, as shown, may have very different proportions than illustrated therein. For example, as indicated in FIGS. 6A and 6B, the dimension B may be substantially zero with the electronic device 30 in the same plane as the antenna range extender.

Alternately, the dimension A may be reduced substantially to zero (not illustrated).

In order to enable the proper tuning of the tuned resonate circuit of the antenna range extender 10, the capacitor 18 may be provided by at least one of a discrete non-polarized capacitor, a surface mount discrete non-polarized capacitor, and or an adjustable trim capacitor. Those skilled in the art would appreciate the advantage of providing the capacitor 18 as a series or parallel combination of a fixed capacitor and an adjustable/tuning capacitor.

Figure 5:
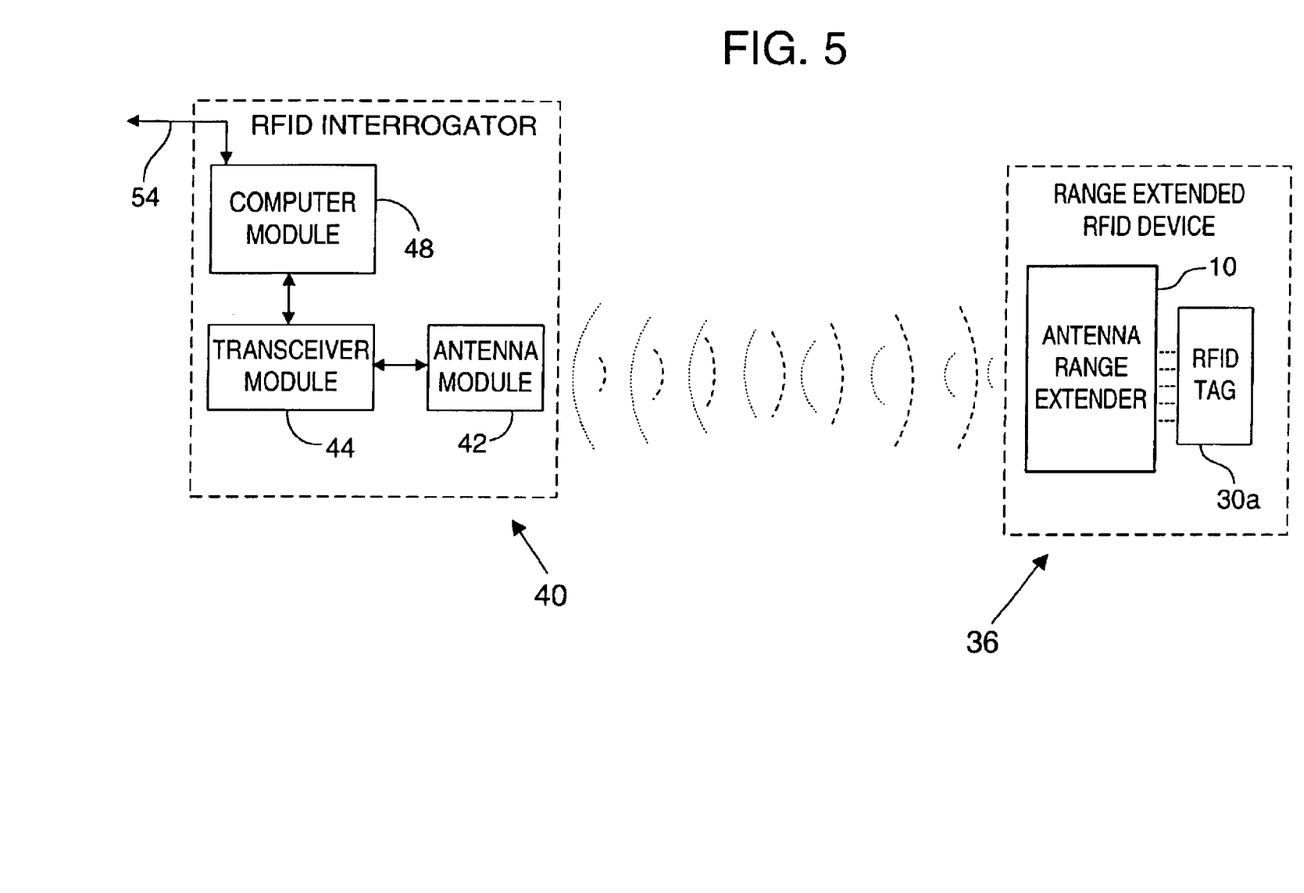
FIG. 5 depicts a high level block diagram of another embodiment of the invention.

Turning now to FIG. 5, a high level block diagram of a second embodiment of the invention shows the antenna range extender 10 positioned interposed, but proximate to the RFID tag 30a. In this embodiment the antenna range extender 10 will typically be physically coupled to the electronic device, but not directly electrically coupled thereto (via a low impedance path). For example, as can be clearly seen in FIG. 6A, the antenna range extender 10 may be embodied upon a substrate such as ring shaped substrate 64a, with a coil 14 formed by an electrical conductor disposed upon or fixed to the substrate 64a. A capacitor 18 may be provided as a surface mounted device, as shown. In addition, it should be understood that the coil 14 of FIGS. 6A and 6B, which are depicted as a single conductive loop, may be provided as a spiral of loops, preferably electrically open in the center area. An example of this version of the coil 14 is depicted in FIG. 8.

Figure 6C:
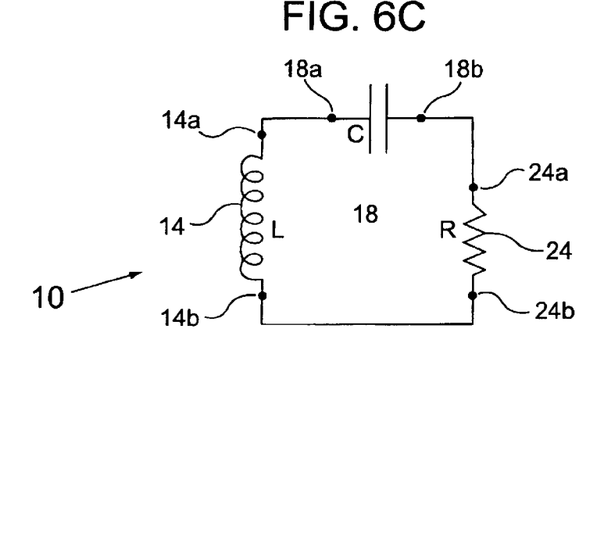
FIG. 6C provides an equivalent circuit schematic for preferred embodiments of the invention. It may be noted that the resistor R shown therein may be omitted from the most preferred embodiments of the invention.

As shown in FIGS. 6B and 6C, an additional component in the form of a discrete resistor 24 may be included in the series tuned resonate circuit. The discrete resistor 24 may preferably have a resistance in the range of 0.5 ohms to 50 ohms, and be provided as either a discrete axial resistor or a surface mount resistor. However physically provided, the resistor 24 is structured with a first (electrical) terminal 24a and a second (electrical) terminal 24b. As shown in FIGS. 6B and 6C, the resistor 24 may be electrically inserted into the series circuit between a terminal of the capacitor 18 and an end of the coil 14—forming an R-L-C tuned resonate circuit.

Another aspect of the invention depicted in FIG. 6B is shown by the substrate upon which the coil 14 may be mounted, preferably along with the capacitor 18 and the electronic device 30. As illustrated therein the substrate may most preferably be provided by a plurality of superposed substrates, such as the substrates 64ba and 64bb. As can be seen via the cut away view of FIG. 6B, the superposing of the substrates may provide a laminated and substantially sealed exterior covering for protecting the components of the improved range extended RFID device 36.

Figure 7A:
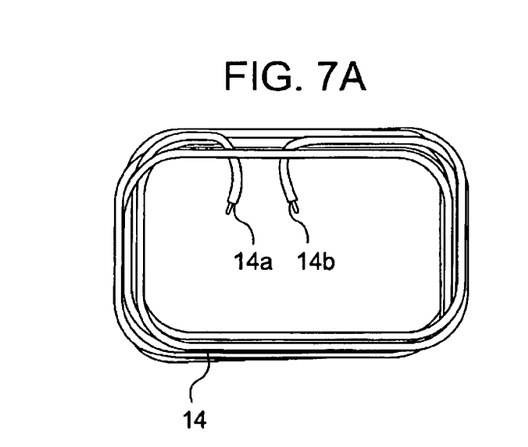
FIGS. 7A, 7B, and 7C provide exemplary embodiments of coils that are employable with embodiments of the antenna range extender.

Turning again to FIGS. 7A, 7B, and 7C, various embodiments of open loop coils 14 are shown in multi-turn configurations. The first embodiment depicted, in FIG. 7A, is a multi-turn coil 14 structured of a plurality of coiled or looped portions formed of an insulated electrical wire. This embodiment is rectangular in shape, having a physically, as well as electrically, open center area with each respective turn (or loop) of the coil 14 closely positioned proximate to a next turn of the coil 14. Accordingly, this first embodiment of the coil 14, which is also shown in FIG. 4, is provided by a discrete plurality of "bunched" loops formed of a conductor with the loops being substantially planar, and possibly potted with a suitable potting material (not illustrated). As with all coil versions of the invention, the coil 14 of FIG. 7A includes a first end 14a and a second end 14b, which are provided for effecting electrical connections to other components of the antenna range extender 10. It may be noted that the embodiments of the coil 14 of FIGS. 4, 7A, and 7B may most preferably be formed with 5 to 15 turns or loops. More or less turns may also be employed as a function of a number of operating and functional characteristics.

Figure 7B:
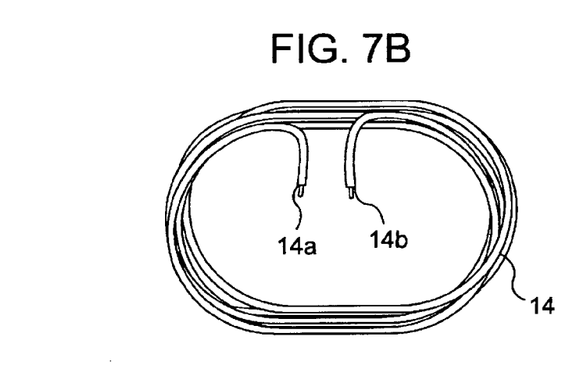

Turning to FIG. 7B, there is a second embodiment of the invention provided that is similar to the embodiment of FIG. 7A. As shown, this embodiment again provides each loop in substantially planar arrangement. However, the second embodiment of FIG. 7B is provided in a more rounded and annular construction. As skilled persons would appreciate, other shapes may be provided based on the desired magnetic coupling and directional range extending characteristics required. For example, fully round/annular versions are certainly contemplated as being within the scope of the present invention.

Figure 7C:
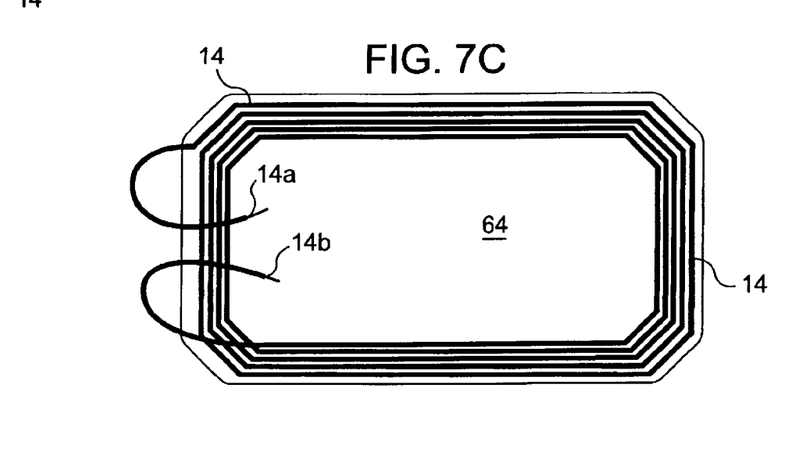

Referring now to FIG. 7C, there is illustrate therein a printed circuit coil 14 formed of an electrical conductor that is provided fixed to, or deposited upon, a substrate 64. As shown, the coil 14 is truly planar and provided by, for example printed circuit traces, that are spiraled upon the substrate 64. As with other exemplary coils in accordance with the present invention, the printed circuit coils 14 of FIG. 7C and FIG. 8 are embodied with an electrically open center area and a center orthogonal axis 60 (as shown in FIG. 4). The center orthogonal axis 60 is orthogonal to a plane passing substantially through the loops of the coil 14, and is preferably nearly centered within the loop, as clearly illustrated in FIG. 4.

When considering the preferred coils 14 of the antenna range extender 10 of the invention, for example as depicted in FIGS. 4, 7A, 7B, 7C, and 8, a number of size and area considerations are possible. For example, when considering operation with an RF carrier frequency of 13.56 MHz, a coil 14 may be embodied having:

a) a substantially rectangular shape having a width and height each in the range of 1 to 10 centimeters;

b) an oval-shape having a width and height each in the range of 1 to 10 centimeters;

c) a circular shape, having diameter in the range of 1 to 10 centimeters; and d) others shapes and sizes providable by skilled person.

It should be noted that the actual dimensions of the coil 14 employed with various embodiments of the antenna range extender 10 of the invention will be determined by a variety of factors, which certainly include the frequency of the RF signal, the construction of the electronic device 30, the construction of the interrogator or reading system, as well as others providable by skilled individuals.

Similarly, when determining of values of electrical the passive electrical components of the preferred embodiments of the invention, the actual values employed, including inductance of the coil 14 and the capacitance of the capacitor 18, may be selected and or determined based on a number of considerations. For example, a significant consideration is the frequency of the RF signal being employed. When considering an embodiment of the invention to be utilized with an RF signal having the frequency of approximately 13.56 MHz, the coil 14 may be preferably provided having an inductance in the range of 3 to 7 microhenries, while the capacitor 18 may be preferably provided having a capacitance in the range of 10 to 30 picofarads.

In addition, the resistance provided in series with the coil 14 and capacitor 18, say in the form of a discrete resistor (such as the resistor 24 of FIG. 6B), may be added providing a series R-L-C tuned resonate circuit as shown schematically in FIG. 6C. Alternately, when considering preferable high Q embodiments, the series resistance may be limited to the resistance provided substantially by the turns of the coil 14.

Turning now to FIG. 8, a printed circuit embodiment of an antenna range extender 10a of the invention is illustrated. At least one substrate 64 is provided with an open-loop (open center) coil 14 provided upon peripheral portions of the substrate 64, in a spiraled planar arrangement. As can be clearly seen, a capacitor 18, and possibly other included components (not illustrated), may also be provided preferably fixed to the substrate 64. As discussed hereinabove, the printed circuit board embodiment 10a of the present invention may be located proximate to either an RF antenna of, for example an RFID interrogator, or an electronic device such as an RFID tag/transponder.

While there have been described herein a plurality of the currently preferred embodiments of the present invention, along with contemplated methods of operation and use, those skilled in the art will recognize that other and further modifications may be made without departing from the invention. For example, it is contemplated that two or more antenna range extenders 10/10a in accordance with the invention may be provided. That is, an embodiment of a range extended RFID interrogator 50 of FIG. 3, along with a range extended RFID device 36 of FIG. 5, may be utilized in combination, possibly providing an even greater operating range than could be realized with only one 'range extended' component. Further, it is contemplated that a coil 14 of the invention may be provided by a combination of printed circuit coil portions and insulated wire coil portions.

As such, the foregoing descriptions of the specific embodiments of the present invention have been presented for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. A magnetically coupled RF antenna range extender structured for extending an operating range between an RF antenna and an electronic device, the antenna range extender comprising:
   a) a passive series tuned resonate circuit including:
      i) a coil formed of at least one turn of an electrical conductor, the coil having a first end and a second end; and
      ii) a capacitor arranged with a first terminal and a second terminal, with the first end of the coil electrically connected to the first terminal and the second end of the coil electrically connected to the second terminal, thereby forming a tuned resonate circuit;
   b) the antenna range extender located proximate to one of the RF antenna and the electronic device, and not directly connected to either, but closely positioned and oriented such that a magnetic coupling is effected when an RF signal is transmitted by the RF antenna, and subsequently received by the electronic device via the antenna range extender and the magnetic coupling;
   c) wherein the antenna range extender is employed for increasing an operating range over which an exchanging of information between the RF antenna and the electronic device can occur.

2. The antenna range extender as recited in claim 1, wherein the electronic device is an RFID device, and the antenna range extender is oriented with a center orthogonal axis of the coil substantially aligned with an axis extending between the RF antenna and the RFID device.

3. The antenna range extender as recited in claim 2, wherein the electronic device is a passive RFID tag.

4. The antenna range extender as recited in claim 2, wherein the coil is formed substantially upon a plane and provided by one of:
   a) an insulated electrical wire substantially formed into a plurality of loops having an electrically open center area; and
   b) a printed circuit coil formed of an electrical conductor that is provided fixed to a flattened substrate.

5. The antenna range extender as recited in claim 4, wherein the capacitor is provided by at least one of:
   a) a discrete non-polarized capacitor;
   b) a surface mounted non-polarized capacitor; and
   c) an adjustable trim capacitor.

6. The antenna range extender as recited in claim 5, wherein the coil is structured and shaped in at least one of:
   a) a substantially rectangular shape having a width and height each in the range of 1 to 10 centimeters;
   b) an oval-shape having a width and height each in the range of 1 to 10 centimeters; and
   c) a circular shape, having a diameter in the range of 1 to 10 centimeters.

7. The antenna range extender as recited in claim 1, wherein:
   a) the coil is provided having an inductance in the range of 3 to 7 microhenries, and structured with an open center area of from 1 to 10 square centimeters; and
   b) the capacitor is provided having a capacitance in the range of 10 to 30 picofarads.

8. The antenna range extender as recited in claim 1, wherein the RF antenna is an antenna portion of a reading head of an RFID interrogator, and the antenna range extender is fixed proximate to the RF antenna of the reading head.

9. The antenna range extender as recited in claim 8, wherein the antenna range extender is mounted within a hand-holdable housing of the RFID interrogator.

10. The antenna range extender as recited in claim 1, wherein the coil is formed upon a substrate of a printed circuit board, and structured with at least one loop.

11. The antenna range extender as recited in claim 10, wherein the RFID tag and the capacitor are each mounted upon the substrate of the printed circuit board, with the coil located proximate to the RFID tag for supporting a magnetic coupling therebetween.

12. A magnetically coupled antenna range extender that is fixed at a selected distance from at least one of an RF antenna and an electronic device, and structured to extend the range at which an RF signal emitted from the RF antenna can be received by the electronic device located within a magnetic field of the RF signal, the antenna range extender comprising:
   a) a multi-turn coil having an open center area and formed of a selected size and a selected number of turns, the coil formed by at least one of:
      i) an insulated wire having a first end and a second end, with each respective turn of the coil closely positioned proximate to a next turn of the coil; and
      ii) a conductor fixed upon a substrate and formed of a plurality of substantially concentric coils provided via a spiral pattern fixed to the substrate, with a non-conductive substantially open center area; and
   b) a capacitor having a first terminal and a second terminal, with the first terminal of the capacitor coupled to the first end of the coil and the second terminal of the capacitor coupled to the second end of the coil;

c) the coil and the capacitor thereby forming a series tuned resonate circuit having a resonate frequency substantially equivalent at least one carrier frequency employed to support an exchange of information between the RF antenna and the electronic device;

d) with the antenna range extender oriented and located proximate to at least one of:
   i) an axis establishable between the RF antenna and the electronic device;
   ii) the RF antenna; and
   iii) the electronic device;

e) wherein the antenna range extender is configured so as to increase the operating range at which information can be exchanged between the RF antenna and the electronic device, when a magnetic coupling results from an emitting of an RF signal transmitted by the RF antenna and received by the electronic device via the antenna range extender and the magnetic coupling.

13. The antenna range extender as recited in claim 12, wherein the antenna range extender is fixed proximate to the RF antenna.

14. The antenna range extender as recited in claim 13, wherein the RF antenna is a portion of an RFID interrogator and the antenna range extender is fixed proximate to the RF antenna within a shared housing.

15. The antenna range extender as recited in claim 14, wherein the electronic device is a passive RFID tag.

16. The antenna range extender as recited in claim 12, wherein the coil and capacitor are provided as:
   a) the coil having an inductance in the range of 3 to 7 microhenries, and structured with an open center area of from 1 to 10 square centimeters; and
   b) a capacitor having a capacitance in the range of 10 to 30 picofarads.

17. The antenna range extender as recited in claim 12, wherein the antenna range extender is structured for operating with an RF carrier signal in the range of 100 kHz to 15 MHz.

18. The antenna range extender as recited in claim 12, further including a discrete resistor having a resistance in the range of 0.5 ohms to 50 ohms, with the resistor electrically inserted and coupled in series between one of:
   a) the first terminal of the capacitor and the first end of the coil; and
   b) the second terminal of the capacitor and the second end of the coil.

19. The antenna range extender as recited in claim 18, wherein the resistor is provided by one of:
   a) a discrete resistor; and
   b) a surface mounted resistor.

20. The antenna range extender as recited in claim 12, wherein the antenna range extender is fixed proximate to the electronic device.

21. The antenna range extender as recited in claim 20, wherein the coil is formed of a conductor fixed upon a substrate and formed of a plurality of substantially concentric turns provided via a spiral pattern upon the substrate.

22. The antenna range extender as recited in claim 21, wherein the coil is formed having an open center area, with the open center area in the range of 1 to 10 square centimeters.

23. The antenna range extender as recited in claim 22, wherein the capacitor is provided by one of:
   a) a discrete non-polarized capacitor;
   b) a surface mounted non-polarized capacitor; and
   c) an adjustable trim capacitor.

24. The antenna range extender as recited in claim 12, wherein the antenna range extender is positioned proximate to the RF antenna with an axis establishable between the RF antenna and the electronic device substantially aligned with a center orthogonal axis of the coil of the antenna range extender.

25. A magnetically coupled antenna range extender that is placed at a selected distance from an RF antenna, so as to be proximate to, and located substantially upon an axis establishable between the RF antenna and a proximate electronic device in order to increase an operating range at which information may be transmitted between the RF antenna and the electronic device, the antenna range extender comprising:
   a) a coil having at least one turn, formed substantially upon a common plane and having an open center area, the coil formed of an electrical conductor having a first end and a second end, with each respective open center turn of the conductor positioned proximate to a next turn, with the turns thereby bunched and substantially formed upon the common plane; and
   b) a capacitor having a first terminal and a second terminal, with the first terminal of the capacitor coupled to the first end of the coil, and the second terminal of the capacitor coupled to the second end of the coil;
   c) the coil and the capacitor thereby forming a tuned resonate circuit having a resonate frequency substantially equivalent to at least one carrier frequency employed to support an exchange of information between the RF antenna and the electronic device;
   d) the antenna range extender employable for increasing an operating range when interposed between the RF antenna and the electronic device, and positioned at the selected distance from the RF antenna so as to be magnetically coupled thereto when an RF signal is transmitted by the RF antenna for receiving, via the antenna range extender, by the electronic device.

26. The antenna range extender as recited in claim 25, wherein the antenna range extender is positioned proximate to the RF antenna such that an axis establishable between the RF antenna and the electronic device is aligned with a center orthogonal axis of the coil of the antenna range extender.

27. The antenna range extender as recited in claim 25, further including a resistor having a first terminal and a second terminal, with the resistor inserted in series with the coil and capacitor, thereby forming a series R-L-C tuned resonate circuit.

28. The antenna range extender as recited in claim 25, wherein the electronic device is an RFID device.

29. The antenna range extender as recited in claim 28, wherein the RFID device is a passive RFID tag.

30. The antenna range extender as recited in claim 25, wherein the RF antenna is a portion of a reading head of an RFID interrogator, and the antenna range extender is mounted proximate to the antenna within a housing of the RFID interrogator.

31. The antenna range extender as recited in claim 25, wherein the coil is formed substantially upon a plane and provided by at least one of:
   a) an insulated electrical wire formed into a plurality of looped portions; and
   b) a printed circuit coil formed of an electrical conductor that is provided having at least one loop with an open center area, and fixed to a substrate thereof.

32. The antenna range extender as recited in claim 31, wherein:
  a) when the coil is formed of the insulated electrical wire, the wire is selected having a wire gauge within the range of 26 to 20 AWG; and
  b) when the coil is a printed circuit coil it is formed with a plurality of loops formed substantially concentrically in a spiral pattern;
  c) with either coil formed having an inductance in the range of 3 to 7 microhenries.

33. The antenna range extender as recited in claim 32, wherein the capacitor is provided by at least one of:
  a) a discrete non-polarized capacitor;
  b) a surface mounted non-polarized capacitor; and
  c) an adjustable trim capacitor.

34. A magnetically coupled antenna range extender fixed proximate to an electronic device such that magnetic coupling is caused by an RF signal generated and emitted by an antenna of operating proximate to the antenna range extender and electronic device, the antenna range extender comprising:
  a) a coil formed of at least one loop having an open center area, and formed substantially upon a plane with an electrical conductor, with the coil having a first end and a second end; and
  b) at least one capacitor having a first terminal and a second terminal;
  c) wherein the first terminal of the capacitor is electrically coupled to the first end of the coil, and the second terminal of the capacitor is electrically coupled to the second end of the coil;
  d) the coil and the capacitor thereby forming the tuned resonate circuit having a resonate frequency substantially equivalent to at least one carrier frequency of an RF signal emitted from the RF antenna, and interposable between the antenna and the electronic device for increasing an operating range therebetween, when a center orthogonal axis of the antenna range extender is substantially aligned with an axis establishable between the RF antenna and the electronic device.

35. The magnetically coupled antenna range extender as recited in claim 34, wherein the electronic device is an RFID device.

36. The magnetically coupled antenna range extender as recited in claim 35, wherein the RFID device is a passive, low cost RFID tag.

37. The magnetically coupled antenna range extender as recited in claim 36, wherein the coil is formed substantially upon a plane with an open center area and provided by a printed circuit coil formed of an electrical conductor that is fixed to a substrate.

38. The magnetically coupled antenna range extender as recited in claim 37, wherein the passive RFID tag and capacitor are each mounted upon the substrate of a printed circuit board.

* * * * *